United States Patent
Öztürk

(10) Patent No.: US 10,824,609 B2
(45) Date of Patent: Nov. 3, 2020

(54) METHOD FOR STORING A SEQUENCE OF DATA RECORDS IN A DATABASE AND COOKING RECIPE TOOL WITH A STORAGE UNIT FOR A DATABASE

(71) Applicant: Seyfettin Öztürk, Schwabach (DE)

(72) Inventor: Seyfettin Öztürk, Schwabach (DE)

( * ) Notice: Subject to any disclaimer, the term of this patent is extended or adjusted under 35 U.S.C. 154(b) by 358 days.

(21) Appl. No.: 15/920,718

(22) Filed: Mar. 14, 2018

(65) Prior Publication Data

US 2018/0268008 A1    Sep. 20, 2018

(30) Foreign Application Priority Data

Mar. 15, 2017   (DE) .......................... 10 2017 204 324

(51) Int. Cl.
*G06F 16/22*    (2019.01)
*G06F 7/08*    (2006.01)

(52) U.S. Cl.
CPC ............ *G06F 16/2228* (2019.01); *G06F 7/08* (2013.01)

(58) Field of Classification Search
CPC .............................. G06F 16/2228; G06F 7/08
See application file for complete search history.

(56) References Cited

U.S. PATENT DOCUMENTS

| 4,901,224 A * | 2/1990 | Ewert ................. G06F 15/8015 712/14 |
| 2017/0046394 A1* | 2/2017 | Skidanov ............ G06F 16/2379 |

OTHER PUBLICATIONS

Schäfer, Georg, Datenstrukturen und Datenbanken, Wiesbaden: Vieweg+Teubner, 1989, pp. 6-28, ISBN 9783528046125.

* cited by examiner

*Primary Examiner* — Loc Tran
(74) *Attorney, Agent, or Firm* — McGlew and Tuttle, P.C.

(57) ABSTRACT

A method for storing a sequence of data records in a database comprises the following steps: creation of a database for storing data records in a creation step, insertion of at least two data records in the database in an insertion step, execution of at least one sorting step, with the data records each comprising an integer position number with at least one digit. In each sorting step, the position numbers of two data records are compared in order to specify and/or determine the sequence of the two data records. Comparison is then performed by processing the digits of the two position numbers individually from left to right and comparing them. One position number is greater than the corresponding other position number as soon as one of its digits is greater than the corresponding digit of the other position number, or if all its digits are identical to the corresponding digits of the second position number and the second position number still has further digits.

1 Claim, 2 Drawing Sheets

_US 10,824,609 B2_

METHOD FOR STORING A SEQUENCE OF DATA RECORDS IN A DATABASE AND COOKING RECIPE TOOL WITH A STORAGE UNIT FOR A DATABASE

CROSS-REFERENCE TO RELATED APPLICATIONS

This application claims priority of German Patent Application No. DE 10 2017 204 324.5 filed on Mar. 15, 2017, pursuant to 35 U.S.C. 119(a)-(d), the content of which is incorporated herein by reference in its entirety as if fully set forth herein.

FIELD OF THE INVENTION

The invention relates to a method for storing a sequence of data records in a database. In particular, the invention relates to a method for storing a sequence of preparation steps in a database of a cooking recipe tool. Furthermore, the invention comprises a cooking recipe tool with a storage unit for a database for storing a sequence of preparation steps.

BACKGROUND OF THE INVENTION

It is known from prior art that for the individual sequence of data records, such as list elements, each data record comprises a separate data field for storing a position number.

When individual data records are inserted or deleted, a new sequential numbering of the position numbers of many data records is usually required. The new position numbers for the respective data records determined in this way must be stored in the data fields provided for this purpose. With large databases, this can lead to numerous read and write actions that take up considerable computing capacity. In the worst-case scenario, for example when inserting a new data record in the first position of the sequence, all existing data records must be updated. Implementation of such data-access transactions, in particular via the internet, is usually complex and time-consuming.

SUMMARY OF THE INVENTION

An object of the present invention is to improve a method for storing a sequence of data records in a database.

This object is achieved by means of a method for storing a sequence of data records in a database, the method comprising the steps of creating a database for storing data records in a creation step, inserting at least two data records in the database in an insertion step, wherein each data record comprises an integer position number with at least one digit, and executing at least one sorting step, wherein in each sorting step, the position numbers of two data records are each compared in order to specify and/or determine a sequence of the two data records, by processing the digits of the two position numbers individually from left to right and comparing them, and interpreting a first one of the two position numbers as being greater than the other, second position number as soon as one digit of the first position number is greater than the corresponding digit of the second position number or if all digits of the first position number are identical to the corresponding digits of the second position number and the second position number still has further digits.

First of all, a database is created for storing data records. At least two data records are then inserted in the database, with each data record comprising an integer position number with at least one digit. To specify and/or determine a sequence of the two data records, at least one sorting step is performed in which each of the position numbers of two data records are compared.

The gist of the invention consists in performing the comparison of the position numbers of two data records in a skillful manner. To this end, the digits of the two position numbers are processed individually from left to right and compared. A first of the two position numbers is interpreted as being greater than the other, second position number as soon as a digit of the first position number is greater than the corresponding digit of the second position number, or if all digits of the first position number are identical to the corresponding digits of the second position number and the second position number still has further digits.

In the sequence of data records, the data record with the greater position number follows the data record with the smaller position number.

The integer position number of each data record can be expressed by its digits in the base of the powers of 10. An example of a position number with n+1 digits (n=0, 1, 2, etc.) is $$\sum_{i=0}^{m} a_i \cdot 10^i = a_n a_{n-1} \ldots a_1 a_0$$

wherein $a_i$ are the digits of the position number at the position of the $i^{th}$ power of 10, with the summation index i going from the lowest power of 10 (i=0) to the greatest power of 10 of the position number, and the digit $a_n$ of the greatest power of 10 of all possible position numbers always being different from 0.

To compare the digits of two position numbers in a sorting step, the digits of both position numbers are processed individually from left to right and compared. This means that in a first step, the digits of both position numbers are compared that are assigned to the highest power of 10 of the respective position number. It shall be noted that the digits to be compared in the two position numbers need not be assigned to the same power of 10. All that matters is the position the digit occupies relative to the respective highest power of 10 of the respective position number. The digits corresponding to each other, i.e. the digits to be compared, are therefore not assigned to the same power of 10, but rather correspond to each other in pro-portion to their assigned power of 10 relative to the highest power of 10 of the respective position number. The first digit of each position number corresponds to the leftmost digit, i.e. the digit of the position number assigned to the highest power of 10. The last digit of the position number is defined as the rightmost digit assigned to the lowest power of 10. The lowest power of 10 for all position numbers is $10^0$.

The sorting step assigns a place value to the position numbers to be compared. The place value of the position number can be expressed by means of a decimal. The place value of the position number stated above with n+1 digits can be determined via the following summation formula:

$$a_n \cdot 10^0 + \sum_{i=0}^{n-1} (-1) \cdot \begin{cases} [10 - (a_i + 1)] \cdot 10^{-(n-i)}, & a_i < 9 \\ 9 \cdot 10^{-(n-i+1)}, & a_i = 9 \end{cases}$$

It is particularly obvious here that the place value is largely determined by the leftmost digit in the position number, i.e. the digit assigned to the highest power of ten of the position numbers.

In the sorting step, the place value of a position number decreases as the number of its digits increases. The place value of a position number can therefore be reduced by adding further digits to the right of the existing digits of the position number. Therefore, the position number 100 is interpreted as being smaller than the position number 10. This applies accord-ingly to the position numbers 10 and 1. The position number 10 is assigned a smaller place value than the position number 1. If the mutually corresponding, left-hand digits of two position numbers differ, the number of digits is no longer decisive. Consequently, the position number 20 is interpreted as being greater than the position number 1.

In the sorting step, the position number 9 is assigned the greatest place value, namely the place value 9. Between two position numbers that differ by 1, there is an infinite number of position numbers with a greater number of digits.

The sorting step described above allows further data records to be arranged in the sequence between two data records the position numbers of which differ by exactly 1. In particular, the method according to the invention allows management of a database without the need for recalculating and reallocating already allocated position numbers of the data records. For example, the new sequential numbering of the position numbers of many data records can be dispensed with when inserting further data records in any position in the sequence of the data records in the database. As a result of this, the computation time and therefore the electricity consumption for managing an electronic database are reduced. In addition, the data volume required when accessing the database, particularly via the Internet, is reduced. In particular, it is possible to insert a data record in a specific position between two existing data records if their position numbers are known.

Furthermore, the sorting step allows the sequence of data records to be specified and/or determined without the need to insert the data records in the database in the correct sequence.

When implementing the method according to the invention in a computer program, the comparison of the position numbers of two data records in the sorting step can be carried out by means of a comparator.

The data records can be elements of a list, for example. In particular, the data records can comprise individual preparation steps of a cooking recipe. In this case, the sequence of the data records corresponds to the sequence of execution of individual preparation steps of the recipe. A database for storing data records that comprise preparation steps can particularly be used in a cooking recipe tool.

According to one aspect of the invention, the method has at least one addition step. In each addition step, at least one additional data record is inserted in the database in any position in the sequence of data records. The addition step allows simple management of the database. The precise number of data records and their sequence need not be known when creating the database. The new sequential numbering of the position numbers of the data records of the database is limited to a minimum of the data records.

The addition step can also be used for re-sorting the database. To this end, the data records to be re-sorted can first of all be deleted from the database and subsequently inserted in the new position in the sequence of the re-maining data records in an addition step. A new sequential numbering of the position numbers of the data records of the database is limited to a minimum in this case as well.

In the addition step, it is possible, for example, to enter further preparation steps of a cooking recipe in a database provided for this purpose.

According to a further aspect of the invention, the position number of the at least one additional data record is determined solely from the position numbers of the respective data record directly preceding it and/or directly succeeding it in the sequence. In this way, the at least one addition step can be performed without the need to read the position numbers of all data records. This allows additional data records to be inserted in a way that is ef-fective and saves computation time.

According to an aspect of the invention, the last, i.e. the rightmost digit of none of the position numbers of the data records is equal to 9 at least before performing the addition step. In this way, the uniqueness of the sequence can be guaranteed even after performing the addition step. Preferably, the last digit of none of the position numbers is equal to 9 even after performing the addition step. This can be ensured by suitable addition steps.

According to a further aspect of the invention, an additional data record is inserted in in the first position of the sequence by calculating the position number of the additional data record as 10 times the position number of the subsequent data record in the sequence. In this connection, the subsequent data record in the sequence means the data record that originally occupied first place in the sequence of the data records. This enables insertion of an additional data record in the first position of the sequence by reading just the position number of one further data record. The position numbers of the already existing data records need not be changed.

According to a further aspect of the invention, an additional data record is inserted in the last position of the sequence. In this case, it is necessary to distinguish whether the last, i.e. the rightmost, digit in the position number of the preceding data record is equal to or not equal to 8. In the event that the last digit of the position number of the preceding data record is not equal to 8, the position number of the additional data record is calculated as being 1 plus the position number of the preceding data record. Otherwise, the position number of the additional data record is determined in such a way that 1 is added to the position number of the preceding data record, and the sum obtained is multiplied by 10. This ensures that the latest, in other words rightmost digit of the position number of the additional data record is not equal to 9.

The preceding data record here means the data record that occupied the last position in the sequence of data records originally, i.e. before the addition step.

This enables fast and uncomplicated insertion of a further data record as only the position number of one further data record has to be read. According to a further aspect of the process, an additional data record is inserted in the sequence between a preceding data record and a succeeding one. To this end, the position numbers of the preceding data record and succeeding data record must be read. In the event that the position numbers of the preceding data record and succeeding data record differ by 1, the position number of the additional data record is calculated as being 10 times the position number of the succeeding data record. If the position numbers of the preceding data record and succeeding data record differ by more than 1, a number of steps need to be performed in order to determine the position number of the additional data record. Firstly, the position number of the additional data record is calculated as being 1 plus the position number of the preceding data record. If the last digit of the preceding data record is equal to 8, then—in addition thereto—the position number, thus obtained, of the additional data record needs to be multiplied by 10. This ensures that the last, i.e. the rightmost digit of the position number of the additional data record is not equal to 9 either. Subsequently, the position number of the additional data record is compared, by means of the sorting step, with the position number of the succeeding data record. If the position number of the succeeding data record is not interpreted as being greater than the position number of the additional data record, the position number of the additional data record must be multiplied by 10 and compared, by means of the sorting step, with the position number of the succeeding data record again until the position number of the succeeding data record is interpreted as being greater than the resulting position number of the additional data record.

As a result of this, insertion of a further data record in any position within the sequence of data records is performed effectively and easily. The new sequential numbering of the position numbers of all succeeding data records in the sequence is avoided.

Another object of the invention is to provide an improved cooking recipe tool.

This object is achieved by means of a cooking recipe tool comprising a storage unit for at least one database for storing a sequence of preparation steps, wherein the storage unit is configured for executing a method according to the invention for storing a sequence of preparation steps in the database.

The cooking recipe tool comprises a storage unit for at least one database for storing a sequence of preparation steps. In this case, the storage unit is configured for execution of a method for storing a sequence of preparation steps in the database, as outlined above.

The recipe tool allows simple management of cooking recipes stored in the database. In particular, further preparation steps can be inserted in an existing recipe. For example, the recipe tool can enable access to various recipes and their preparation steps via the internet. To this end, the recipe tool can have a data interface or an interface for a user by means of which the user can read, insert, and edit recipes and in particular the preparation steps thereof. Alternatively, the recipe tool can also be configured for use with food processors. For example, the recipe tool can be configured as a memory card for food processors.

The further advantages of the recipe tool correspond to those of the process.

Further features and advantages of the invention are described on the basis of the following exemplary embodiments.

DESCRIPTION OF THE PREFERRED EMBODIMENTS

Figure 1:
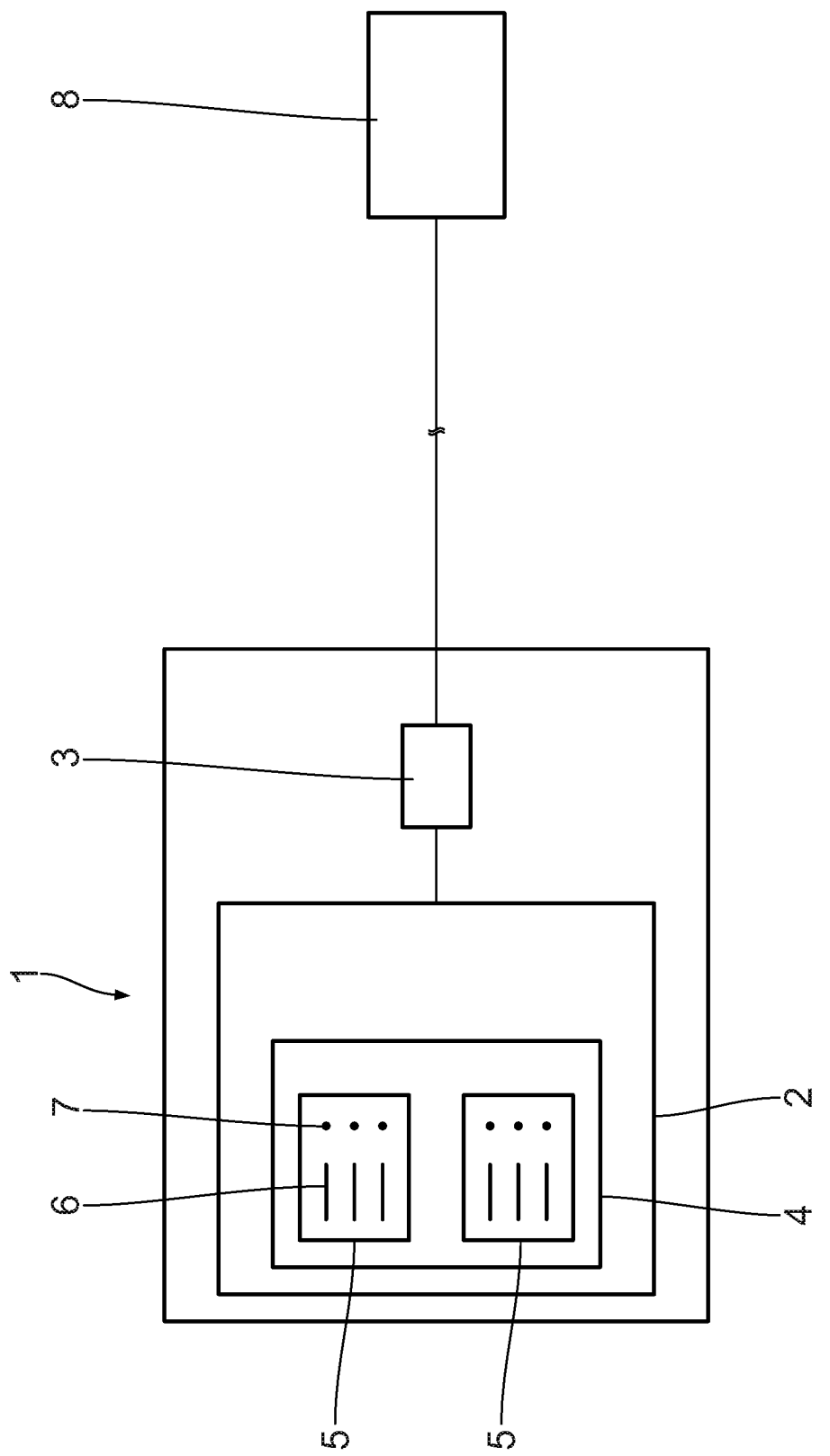
FIG. 1 a recipe tool with a storage unit for at least one database.

FIG. 1 shows a recipe tool 1. The recipe tool 1 comprises a storage unit 2 and a data interface 3. The storage unit 2 has a memory 4. At least one database 5 can be stored in the memory 4. In the embodiment shown in FIG. 1, two databases 5 are stored in the memory 4. The databases 5 here each contain a recipe. Each database 5 comprises at least one data record 6, with the data record 6 corresponding to a preparation step of the respective recipe. The sequence of preparation steps corresponds to a sequence of the data records 6. To this end, each data record 6 has a data field 7 for an integer position number with at least one digit. The sequence of the data records 6 can therefore be specified and determined by means of the position numbers.

The recipe tool 1 is connected with a terminal 8 in a data-transmitting manner via the data interface 3. In the embodiment set out here, the terminal 8 is an internet-enabled device of a recipe tool user. The data-transmitting connection between the data interface 3 and the terminal 8 is effected via the Internet. The recipe tool user can retrieve the recipes stored in the databases 5 and the preparation steps thereof. In a further embodiment, the terminal 8 is a food processor. The food processor can also access the recipe tool 1 via the internet. Alternatively, the recipe tool 1 can be executed as a memory card that can be directly connected with the terminal 8 and read by it. In a further embodiment not set out here, instead of the data interface 3, an interface is provided via which a recipe tool user can read and edit the data stored in the databases 5.

By means of the data interface 3, new recipes in the form of databases 5 can be stored in the memory 4 of the storage unit 2. To this end, for each new recipe, a database 5 is created first and at least one data record 6 is inserted. In addition, it is possible to insert further preparation steps in an already stored recipe. Insertion of the further preparation steps is performed by inserting the corresponding data records 6 in the sequence of the data records 6 already stored in the database 5 in an addition step. The storage unit 2 then allows additional data records 6 to be inserted in any position in the sequence of the data records 6 without the need for new sequential numbering of the position numbers of all data records 6.

Figure 2:
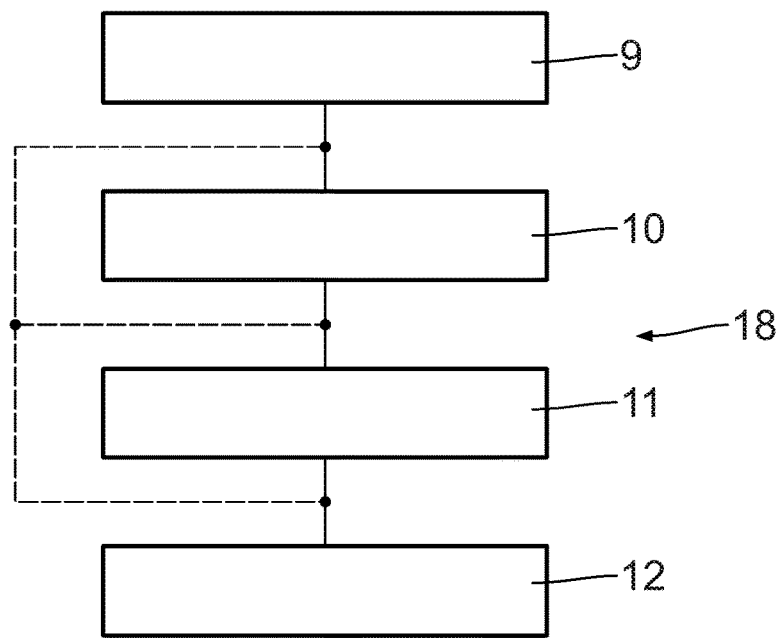
FIG. 2 a schematic method sequence for storage of a sequence of data records in a database.

FIG. 2 shows a storage method 18 for storing a sequence of data records in a database. First of all, in a creation step 9, a database is created for storing data records. In an insertion step 10, at least two data records are then inserted in the database, with each data record comprising an integer position number with at least one digit. This is followed by at least one sorting step 11, with the position numbers of two data records each being compared in order to specify and/or determine a sequence of the data records. The sorting step 11 can be repeated several times, like the insertion step 10. At least one addition step 12 can then be performed, in which at least one additional data record is inserted in the database in any position in the sequence of data records.

Figure 3:
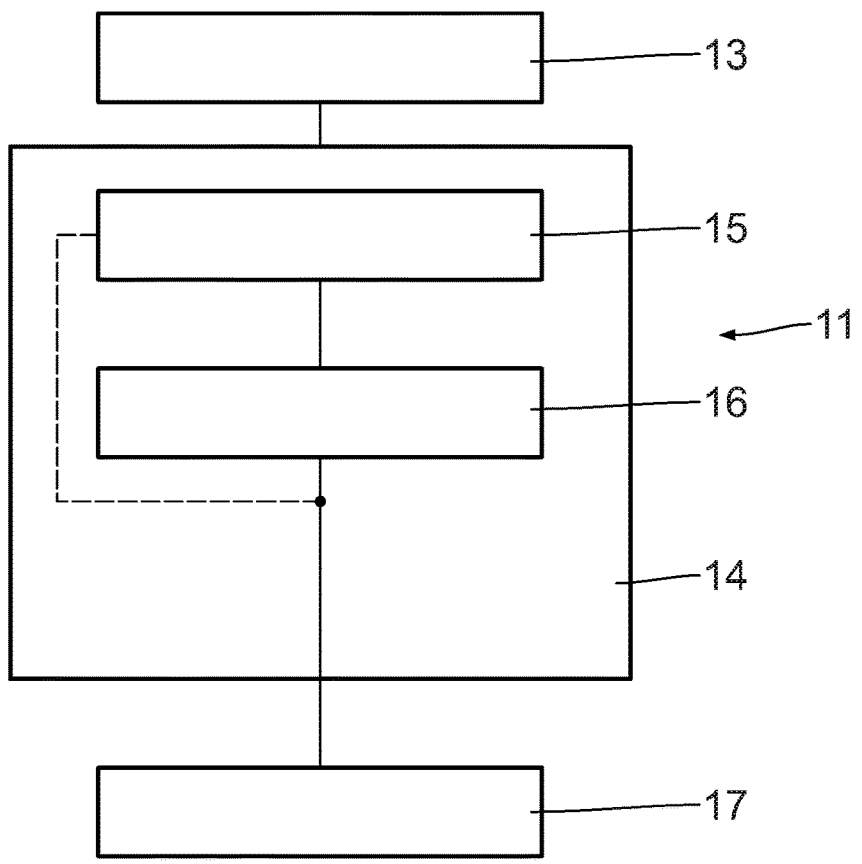
FIG. 3 a schematic sequence of a sorting step.

FIG. 3 shows a schematic method sequence of the sorting step 11. First of all, in an optional reading step 13, the position numbers of the data records can be read, for example if these are not otherwise known when performing the sorting step 11. This is followed by the comparison step 14. In the comparison step 14, the individual digits of the position numbers to be compared are processed from left to right in a respective processing step 15. For each processing step 15, i.e. for the mutually corresponding digits of the position numbers, a digit comparison step 16 is performed. If one of the digits is identified in the digit comparison step 16 as being greater, the position number with the greater digit is specified as being greater and the comparison step 14 is ended. If the digits in the digit comparison step 16 are assessed as being identical, the processing step 15 is performed for the next digit. If one of the two position numbers has no further digits for which a processing step 15 can be performed, the comparison step 14 is complete. The position number with fewer digits is specified as being greater. The comparison step 14 can be followed by an output step 17 in which the determined sequence of both data records is output. In a preferred exemplary embodiment, the greater position number in the sequence follows the smaller position number. The output step 17 can be used here for displaying a sequence of the data records or for further processing of the data records.

The storage method 18 and in particular the sorting step 11 can be applied to the data records 6 of the databases 5 of the recipe tool 1, with the storage unit 2 of the recipe tool 1 being configured for execution of the storage method 18. To this end, the storage unit 2 of the recipe tool 1 comprises a suitable comparator. As a processing unit, the comparator can directly access the memory 4 of the storage unit 2 in order to execute the storage method 18 and the sorting step 11. Alternatively, the comparator can also be stored in the form of a calculation rule in the memory 4 of the storage unit 2 and be read from the terminal 8 via the interface 3. In this case, the terminal 8 can determine and specify the sequence of the data records 6 of a database 5 by means of the calculation rule stored in the comparator. The function of the comparator and the execution of an extension step are explained in more detail on the basis of the following exemplary embodiments.

The comparator compares two position numbers and determines whether a first position number is greater than the other, second position number. For this purpose, the individual digits of the two position numbers are processed individually from left to right and compared.

If a digit of the first position number is greater than the corresponding digit of the second position number in the digit-for-digit comparison—from left to right—then the first position number is greater.

If a digit of the second position number is greater than the digit of the first position number in the digit-for-digit comparison—from left to right—then the second position number is greater.

This is explained in more detail on the basis of an exemplary embodiment in accordance with Table 1.

TABLE 1

Comparison of two position numbers $P_1$ and $P_2$ by the comparator

| Position number $P_1$ | Position number $P_2$ | Comparator |
|---|---|---|
| 233 | 235 | $P_2 > P_1$ |
| 2678 | 2685 | $P_2 > P_1$ |
| 22111 | 211 | $P_1 > P_2$ |

If all digits of the first position number are processed and identical to the corresponding digits of the second position number, and the other, second position number still has further digits, then the first position number is greater.

This is explained in more detail on the basis of an exemplary embodiment in accordance with Table 2.

TABLE 2

Comparison of two position numbers $P_1$ and $P_2$ by the comparator

| Position number $P_1$ | Position number $P_2$ | Comparator |
|---|---|---|
| 56 | 567 | $P_1 > P_2$ |
| 2687 | 26 | $P_2 > P_1$ |
| 2 | 211 | $P_1 > P_2$ |

In the sequence, the data record with the greater position number determined by the comparator follows the data record with the smaller position number.

The insertion of a further data record in the database in any position in the sequence of data records in an addition step is now described below. The position numbers of the original data records are selected in such a way that the last, i.e. rightmost digit thereof is in each case not equal to 9.

When executing the addition step, it must be distinguished whether the additional data record is inserted in in the first position of the sequence, in the last position of the sequence, or between a preceding data record and a succeeding data record.

The position number $P_n$ of the additional data record in the first position of the sequence of data records is obtained by multiplying the position number $P_1$ of the succeeding data record, which was previously in the first position, in the sequence by the number 10: $P_n = 10 \cdot P_1$.

If the position number of the data record that was previously in the first position was 1, for example, the position number of the additional data record is 10. As the place value of a position number becomes smaller by adding further digits to the right of the existing digits of the position number, the comparator will position the data record with the position number 10 in the first position of the sequence.

This is explained in more detail on the basis of an exemplary embodiment in accordance with Table 3.

TABLE 3

Inserting a data record in the first position of the sequence

| Position numbers before insertion | Position numbers after insertion |
|---|---|
| 1 | 10 ($P_n$) |
| 2 | 1 ($P_1$) |
| 3 | 2 |
| etc. | 3 |

When inserting new data records between the beginning and end of the sequence, the position numbers of the preceding data record and succeeding data record are examined.

If the position number $P_i$ of the preceding data record is only one less than the position number $P_{i+1}$ of the succeeding data record, then the position number $P_n$ of the new data record is obtained by multiplying the position number $P_{i+1}$ of the successor by the number 10:

$$P_n = P_{i+1} \cdot 10.$$

This is explained in more detail on the basis of an exemplary embodiment in accordance with Table 4.

TABLE 4

Inserting a data record between position numbers 1 and 2

| Position numbers before insertion | Position numbers after insertion |
|---|---|
| 1 | 1 ($P_i$) |
| 2 | 20 ($P_n$) |
| 3 | 2 ($P_{i+1}$) |
| etc. | 3 |

If the difference between the position number $P_i$ of the preceding data record and the position number $P_{i+1}$ of the succeeding data record is not equal to one and if the last, rightmost digit of the position number of the preceding data record is less than 8, then the position number $P_n$ of the additional data record is one greater than that of the preceding data record: $P_n=P_{i+1}$. The position number $P_n$ of the additional data record is then compared with the position number $P_{i+1}$ of the succeeding data record by means of sorting step 11.

If the position number $P_n$ of the additional data record is smaller than the position number $P_{i+1}$ of the succeeding data record ($P_n<P_{i+1}$), then the position number $P_n$ calculated previously remains unchanged. This is explained in more detail on the basis of an exemplary embodiment in accordance with Table 5.

TABLE 5

Inserting a data record between position numbers 15 and 1

| Position numbers before insertion | Position numbers after insertion |
|---|---|
| 15 | 15 ($P_i$) |
| 1 | 16 ($P_n$) |
| 2 | 1 ($P_{i+1}$) |
| 3 | 2 |
| etc. | 3 |

If the position number $P_n$ of the additional data record is not smaller than the position number $P_{i+1}$ of the succeeding data record ($P_n \geq P_{i+1}$), it is multiplied by 10 ($P_n=P_n \cdot 10$) and compared, by means of the sorting step, with the position number $P_{i+1}$ of the succeeding data record again until the position number $P_{i+1}$ of the succeeding data record is interpreted as being greater than the resulting position number $P_n$ of the additional data record. This will be explained in more detail by means of an exemplary embodiment in accordance with table 6. In this case, after a first step, $P_n=P_i+1=16>160=P_{i+1}$. Having multiplied $P_n$ by 10 twice, the final position number of the additional data record is obtained as being $P_n=1600<160=P_{i+1}$.

TABLE 6

Inserting a data record between position numbers 15 and 160

| Position numbers before insertion | Position numbers after insertion |
|---|---|
| 15 | 15 ($P_i$) |
| 160 | 1600 ($P_n$) |
| 2 | 160 ($P_{i+1}$) |
| 3 | 2 |
| etc. | 3 |

If the difference between the position numbers $P_i$ and $P_{i+1}$ of the preceding data record and succeeding data record is not 1 and the rightmost digit of the position number of the preceding data record is 8, then the new position number is determined by adding 1 to the position number $P_i$ of the preceding data record and the sum thus obtained is multiplied by 10:

$$P_n=(P_i+1) \cdot 10.$$

The position number $P_n$ of the additional data record is then compared with the position number $P_i$ of the succeeding data record by means of the sorting step 11.

If the position number $P_n$ of the succeeding data record is smaller than the position number $P_i$ of the succeeding data record (($P_n<P_{i+1}$), then the position number $P_n$ remains unchanged. This will be explained in more detail by means of an exemplary embodiment in accordance with table 7.

TABLE 7

Inserting a data record between position numbers 28 and 2

| Position numbers before insertion | Position numbers after insertion |
|---|---|
| 1 | 1 |
| 28 | 28 ($P_i$) |
| 2 | 290 ($P_n$) |
| 3 | 2 ($P_{i+1}$) |
| etc. | 3 |

If the position number $P_n$ of the additional data record is not smaller than the position number $P_{i+1}$ of the succeeding data record ($P_n \geq P_{i+1}$), it is multiplied by 10 ($P_n=P_n \cdot 10$) and compared, by means of the sorting step, with the position number $P_{i+1}$ of the succeeding data record again until the position number $P_{i+1}$ of the succeeding data record is interpreted as being greater than the resulting position number $P_n$ of the additional data record. This will be explained by means of an exemplary embodiment in accordance with table 8. In this case, after a first step, $P_n=(P_i+1) \cdot 10=290=P_{i+1}$. Having multiplied $P_n$ by 10 again, the final position number of the additional data record is obtained as being $P_n=2900<290=P_{i+1}$.

TABLE 8

Inserting a data record between position numbers 28 and 290

| Position numbers before insertion | Position numbers after insertion |
|---|---|
| 1 | 1 |
| 28 | 28 ($P_i$) |
| 290 | 2900 ($P_n$) |
| 3 | 290 ($P_{i+1}$) |
| etc. | 3 |

When data records are inserted at the end of the sequence, the position number of the preceding data record is examined. If the last, rightmost digit of the position number $P_i$ of the preceding data record is less than 8, then the position number $P_n$ of the additional data record is the position number $P_i$ of the preceding data record plus one: $P_n=P_i+1$.

This is explained in more detail on the basis of an exemplary embodiment in accordance with Table 9.

TABLE 9

Inserting a data record at the end

| Position numbers before insertion | Position numbers after insertion |
|---|---|
| 83 | 83 |
| 84 | 84 |
| 85 | 85 ($P_i$) |
|  | 86 ($P_n$) |

If the rightmost digit of the position number $P_i$ of the preceding data record is 8, then the position number $P_n$ is determined by adding 1 to the position number $P_i$ of the preceding data record and the sum thus obtained is multiplied by 10: $P_n=(P_i+1) \cdot 10$.

This is explained in more detail on the basis of an exemplary embodiment in accordance with Table 10.

TABLE 10

Inserting a data record at the end

| Position numbers before insertion | Position numbers after insertion |
|---|---|
| 6 | 6 |
| 7 | 7 |
| 8 | 8 ($P_i$) |
|   | 90 ($P_n$) |

The position numbers of already existing data records need not be changed when inserting an additional data record in the sequence of data records in the database.

An alternative embodiment for performing the addition step will be described in the following sections. The alternative embodiment described hereinafter can be used in particular if the sequence of the data records contains one or more position numbers the last digit of which is equal to 9. The cases in which the additional data record is inserted in in the first position of the sequence, in the last position of the sequence, or between a preceding data record and a succeeding data record must be distinguished as well when executing the alternative addition step.

The position number $P_n$ of the additional data record in the first position of the sequence of data records is obtained by multiplying the position number $P_i$ of the succeeding data record, which was previously in the first position, in the sequence by the number 10: $P_n = 10 \cdot P_1$.

If the position number of the data record that was previously in the first position was 1, for example, the position number of the additional data record is 10. As the place value of a position number becomes smaller by adding further digits to the right of the existing digits of the position number, the comparator will position the data record with the position number 10 in the first position of the sequence.

This is explained in more detail on the basis of an exemplary embodiment in accordance with Table 11.

TABLE 11

Inserting a data record in the first position of the sequence according to an alternative addition step

| Position numbers before insertion | Position numbers after insertion |
|---|---|
| 1 | 10 ($P_n$) |
| 2 | 1 ($P_1$) |
| 3 | 2 |
| etc. | 3 |

When inserting new data records between the beginning and end of the sequence, the position numbers of the preceding data record and succeeding data record are examined.

If the position number $P_i$ of the preceding data record is only one less than the position number $P_{i+1}$ of the succeeding data record, then the position number $P_n$ of the new data record is obtained by multiplying the position number $P_{i+1}$ of the successor by the number 10:

$$P_n = P_{i+1} \cdot 10.$$

This is explained in more detail on the basis of an exemplary embodiment in accordance with Table 12.

TABLE 12

Inserting a data record between position numbers 1 and 2 according to an alternative addition step

| Position numbers before insertion | Position numbers after insertion |
|---|---|
| 1 | 1 ($P_i$) |
| 2 | 20 ($P_n$) |
| 3 | 2 ($P_{i+1}$) |
| etc. | 3 |

If the difference between the position number $P_i$ of the preceding data record and the position number $P_{i+1}$ of the succeeding data record is not equal to one and if the last, rightmost digit of the position number of the preceding data record is less than 9, then the position number $P_n$ of the additional data record is one greater than that of the preceding data record:

$$P_n = P_{i+1}.$$

This is explained in more detail on the basis of an exemplary embodiment in accordance with Table 13.

TABLE 13

Inserting a data record between position numbers 15 and 1 according to an alternative addition step

| Position numbers before insertion | Position numbers after insertion |
|---|---|
| 15 | 15 ($P_i$) |
| 1 | 16 ($P_n$) |
| 2 | 1 ($P_{i+1}$) |
| 3 | 2 |
| etc. | 3 |

If the difference between the position numbers $P_i$ and $P_{i+1}$ of the preceding data record and the succeeding data record ($P_n \geq P_{i+1}$) is not equal to 1 and the rightmost digit of the position number of the preceding data record is equal to 9, then the new position number of the preceding data record is obtained by multiplying the original position number $P_{i+1}$ of the succeeding data record by the number 10, i.e. $P_i = 10 \cdot P_{i+1}$, of the additional data record is obtained by multiplying the original position number $P_{i+1}$ of the succeeding data record by the number 10 plus one: $P_n = (P_{i+1} \cdot 10) + 1$, and of the succeeding data record is obtained by multiplying the original position number $P_{i+1}$ of the succeeding data record by the number 10 plus two: $P_{i+1} = (P_{i+1} \cdot 10) + 2$.

This is explained in more detail on the basis of an exemplary embodiment in accordance with Table 14.

TABLE 14

Inserting a data record between position numbers 29 and 2 according to an alternative embodiment

| Position numbers before insertion | Position numbers after insertion |
|---|---|
| 1 | 1 |
| 29 | 20 ($P_i$) |
| 2 | 21 ($P_n$) |
| 3 | 22 ($P_{i+1}$) |
| etc. | 3 |

When data records are inserted at the end of the sequence, the position number of the preceding data record is examined. If the last, rightmost digit of the position number $P_i$ of the preceding data record is less than 9, then the position number $P_n$ of the additional data record is the position number $P_i$ of the preceding data record plus one: $P_n=P_i+1$.

This will be explained in more detail by means of an exemplary embodiment in accordance with table 15.

TABLE 15

Inserting a data record at the end according to an alternative addition step

| Position numbers before insertion | Position numbers after insertion |
|---|---|
| 83 | 83 |
| 84 | 84 |
| 85 | 85 ($P_i$) |
|  | 86 ($P_n$) |

If the rightmost digit of the position number $P_i$ of the preceding data record is 9, then the position number
- of the preceding data record is obtained by multiplying the original position number $P_i$ of the preceding data record by the number 10: $P_i=P_i\cdot 10$, and
- of the additional data record is obtained by multiplying the original position number $P_i$ of the preceding data record by the number 10 plus one: $P_n=(P_i\cdot 10)+1$.

This is explained in more detail on the basis of an exemplary embodiment in accordance with Table 16.

TABLE 16

Inserting a data record at the end according to an alternative addition step

| Position numbers before insertion | Position numbers after insertion |
|---|---|
| 7 | 7 |
| 8 | 8 |
| 9 | 90 ($P_i$) |
|  | 91 ($P_n$) |

A sequential numbering of the position numbers of all data records is not necessary when inserting an additional data record in the sequence of data records in the database.

What is claimed is:

1. A method for storing a sequence of data records in a database, the method comprising the following steps:
    creating a database for storing data records in a creation step;
    inserting at least two data records in the database in an insertion step, wherein each data record comprises an integer position number with at least one digit; and
    executing at least one sorting step, wherein in each sorting step, the integer position numbers of two data records are each compared in order to specify a sequence of the two data records, by processing the digits of the two integer position numbers individually from left to right and comparing them, and interpreting a first one of the two integer position numbers as being greater than the other, second integer position number if one of the following conditions is fulfilled: one digit of the first integer position number is greater than the corresponding digit of the second integer position number; all digits of the first integer position number are identical to the corresponding digits of the second integer position number and the second integer position number still has further digits;
    at least one addition step, in which at least one additional data record is inserted in the database in any position in the sequence of data records, wherein the integer position number of the at least one additional data record is determined solely from the integer position numbers of the respective data record directly preceding it in the sequence of data records and the integer position numbers of the respective data record directly succeeding it in the sequence of data records, wherein an additional data record is inserted in the sequence of data records between a preceding data record and a succeeding data record, wherein one of the following statements holds true:
    if the integer position numbers of the preceding data record and of the succeeding data record differ by 1, the integer position number of the additional data record is calculated as being 10 times the integer position number of the succeeding data record;
    if the integer position numbers of the preceding data record and of the succeeding data record differ by more than 1, then the integer position number of the additional data record is determined by: calculating the integer position number of the additional data record as being 1 plus the integer position number of the preceding data record;
    if the last digit of the integer position number of the preceding data record is equal to 8, the previously calculated integer position number of the additional data record is multiplied by 10, and the integer position number of the additional data record is compared, by means of the sorting step, with the integer position number of the succeeding data record and, if the integer position number of the succeeding data record is not interpreted as being greater than the integer position number of the additional data record, it is multiplied by 10 and compared, by means of the sorting step, with the integer position number of the succeeding data record again until the integer position number of the succeeding data record is interpreted as being greater than the resulting integer position number of the additional data record.

* * * * *